March 2, 1948.  W. M. HOWSER  2,436,996
SEALED DRIVING BUSHING
Filed Dec. 11, 1944
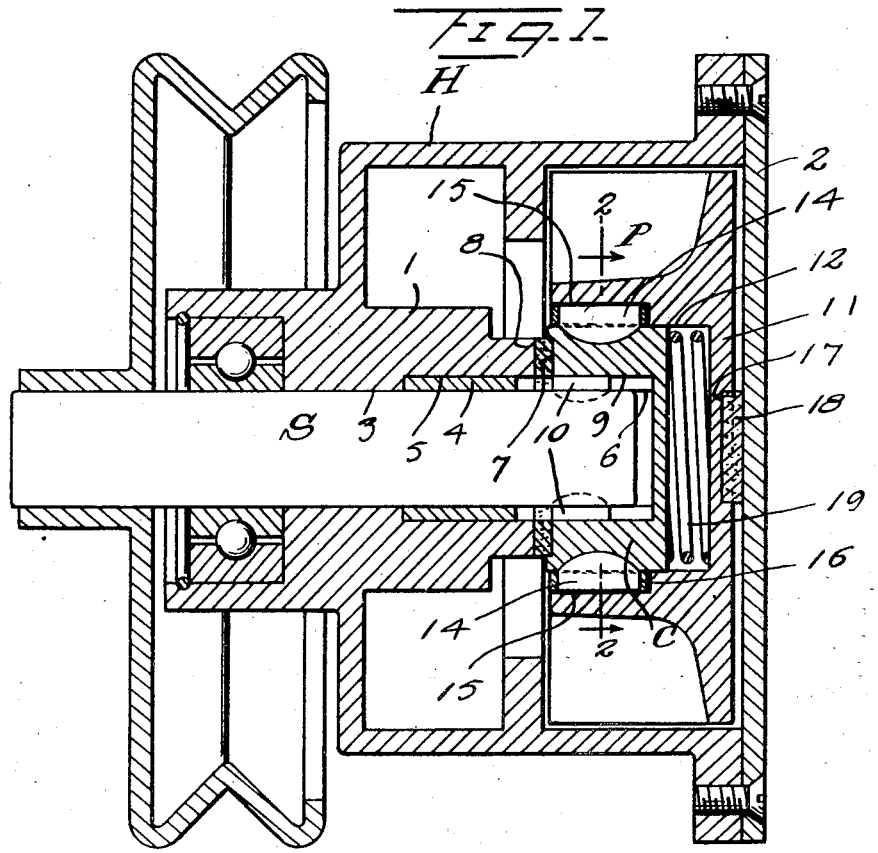
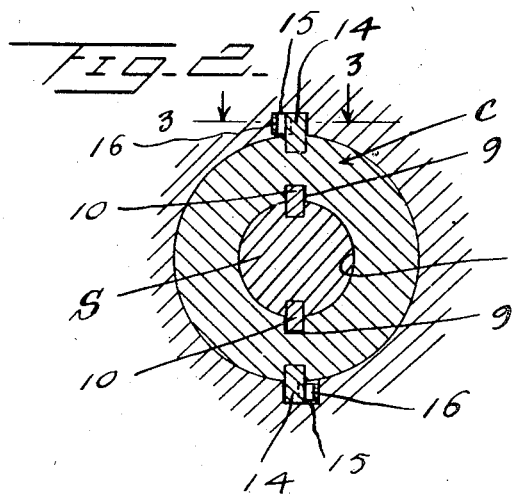
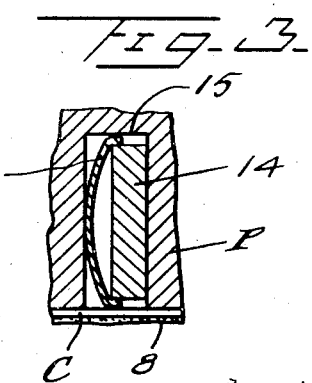
Inventor
Walter M. Howser
Attorney Patented Mar. 2, 1948

2,436,996

UNITED STATES PATENT OFFICE 2,436,996

SEALED DRIVING BUSHING

Walter M. Howser, Indianapolis, Ind.

Application December 11, 1944, Serial No. 567,673

7 Claims. (Cl. 103—103)

This invention relates to a sealed driving bushing for use in connection with the impeller shaft of a fluid pump, refrigeration compressor, and the like and it is primarily an object of the invention to provide a bushing of this kind which is slidably mounted on an end portion of the shaft with the impeller slidably mounted on the bushing, whereby the impeller is allowed to thrust against the back plate of the housing and particularly when the impeller is under extremely high speed.

It is also an object of the invention to provide a bushing which will be free to hold its pressure seal when the impeller is drawn over to the side of the housing from which the fluid is discharged.

Furthermore, it is an object of the invention to provide a bushing which allows the impeller to be maintained at the intake side of the pump and which is provided by means coacting with the bushing to resist the thrust of the fluid upon the impeller.

An additional object of the invention is to provide a bushing of this kind which is mounted or applied in a manner whereby the running face of the bushing is free from the thrust on the impeller mounted upon the bushing.

The invention consists in the details of construction and in the combination and arrangement of the several parts of my improved sealed driving bushing whereby certain important advantages are attained, as will be hereinafter more fully set forth.

In order that my invention may be the better understood, I will now proceed to describe the same with reference to the accompanying drawings, wherein:

Figure 1 is a view partly in section and partly in elevation illustrating a sealed driving bushing constructed in accordance with an embodiment of the invention;

Figure 2 is a sectional view taken substantially on the line 2—2 of Figure 1; and Figure 3 is a sectional view taken substantially on the line 3—3 of Figure 2.

As disclosed in the accompanying drawings, H denotes the housing of a fluid pump or the like having at its intake side the inwardly disposed bearing block 1 through which is directed the impeller shaft S. The side face remote from the bearing block 1, or the back face as it may be termed, is open but adapted to be closed by the removable back plate 2.

The impeller shaft S has its inner or inserted end terminating a predetermined distance inwardly of the open back face of the housing H and the bore 3 of the bearing block has its inner portion enlarged, as at 4, and into which enlarged portion is fitted an antifriction sleeve or thimble 5.

The bearing cup C is of desired dimensions and the outer or free end portion of the bore 6 of the cup C is counterbored, as at 7, and engaged within this counterbore 7 is a friction washer 8 for coaction with the adjacent outer end of the end face of the bearing block 1.

At diametrically opposed points, or otherwise as may be desired, the wall of the bore 6 of the cup C is milled to provide the keyways 9 into which snugly engage the outstanding keys 10. These keys 10 and, of course, the keyways 9 are disposed in a direction lengthwise of the shaft S, whereby the cup C, while keyed for rotation with the shaft S, is free for movement lengthwise thereof within, of course, certain limitations.

The impeller P, which may be as desired, includes a hub 11 having a bore 12 extending the major distance therethrough and open at the inner or inserted side of the hub. This bore 12 snugly receives the bearing cup C and is held thereon for rotation therewith by the keys 14 carried by the periphery of the cup C and disposed lengthwise thereof and which are received in the keyways 15 provided in the wall of the bore 12 and open at the inner end thereof. The keys 14 each carries an anti-back lash spring 16 and for which reason each of the keyways 15 is cut wider than the key 14 proper.

The outer face of the hub 11 is closed and at the axial center thereof is provided with a recess or pocket 17 in which is fitted a friction disk 18 which extends slightly beyond said face of the hub.

Within the inner portion of the bore 12 is an expansible member 19 of requisite tension and herein disclosed as a coil spring, said member 19 bearing against the inserted face of the cup C and the closed end of the hub 11.

When the back plate is drawn into place, the spring 19 is put under desired tension whereby the impeller P will be maintained in effective position yet permitting the bearing cup C to be free of the thrust on the impeller.

From the foregoing it is believed to be apparent that the invention as herein embodied is one wherein the washer 8 alone makes the desired seal and that the assembly is one which readily compensates for wear and that the seal created assures the fluid from getting into the pump bearings. It is also believed to be obvious that the pump bearing is of a type whereby the same, together with the impeller, can be readily applied and maintained in effective working position without the use of holding screws and that the assembly is also one whereby the seal will not be affected with corrosion.

From the foregoing description it is thought to be obvious that a sealed driving bushing constructed in accordance with my invention is particularly well adapted for use by reason of the convenience and facility with which it may be assembled and operated.

I claim:

1. A mounting for an impeller upon its shaft comprising a cupped bearing slidably mounted on an extremity of the shaft, means for holding said bearing on the shaft for rotation therewith, means for slidably mounting the impeller on the bearing but held thereto for rotation therewith, and means coacting with the impeller and the bearing for placing the bearing under tension to resist the thrust imposed upon the impeller.

2. A mounting for an impeller upon its shaft comprising a cupped bearing slidably mounted on an extremity of the shaft, means for holding said bearing on the shaft for rotation therewith, means for slidably mounting the impeller on the bearing but held thereto for rotation therewith, means coacting with the impeller and the bearing for placing the bearing under tension to resist the thrust imposed upon the impeller, and means coacting with the impeller for maintaining the expansible means under tension.

3. The combination with an impeller shaft and a bearing block therefor beyond which an end portion of the shaft extends, a cupped bearing slidably mounted upon said end portion of the shaft, means for holding said bearing to the shaft for rotation therewith, an impeller having a hub, said hub having a bore extending partially therethrough and open at one end, the bearing being snugly received within said bore, said hub being free for movement lengthwise of the shaft, means for holding the hub to the bearing for rotation therewith, and an expansible member interposed between the inner end of the hub of the impeller and the cupped bearing for constantly urging said cupped bearing toward the shaft.

4. The combination with an impeller shaft and a bearing block therefor beyond which an end portion of the shaft extends, a cupped bearing slidably mounted upon said end portion of the shaft, means for holding said bearing to the shaft for rotation therewith, an impeller having a hub, said hub having a bore extending partially therethrough and open at one end, the bearing being snugly received within said bore, said hub being free for movement lengthwise of the shaft, means for holding the hub to the bearing for rotation therewith, an expansible member interposed between the inner end of the hub of the impeller and the cupped bearing for constantly urging said cupped bearing toward the shaft, and a friction washer surrounding the shaft and interposed between the cupped bearing and the bearing for the shaft, said friction washer constituting a sealing medium.

5. The combination with an impeller shaft and a bearing block therefor beyond which an end portion of the shaft extends, a cupped bearing slidably mounted upon said end portion of the shaft, means for holding said bearing to the shaft for rotation therewith, an impeller having a hub, said hub having a bore extending partially therethrough and open at one end, the bearing being snugly received within said bore, said hub being free for movement lengthwise of the shaft, means for holding the hub to the bearing for rotation therewith, an expansible member interposed between the inner end of the hub of the impeller and the cupped bearing for constantly urging said cupped bearing toward the shaft, and a friction washer surrounding the shaft and interposed between the cupped bearing and the bearing for the shaft, said friction washer constituting a sealing medium, said friction washer being carried by the cupped bearing.

6. In a pump or the like, a housing, a bearing carried by the housing and having an end face within the housing, an impeller shaft extending within the housing through said bearing and extending beyond the inner face thereof, the portion of the housing opposed to the bearing being open, a plate for closing said open portion, a cupped bearing slidably mounted on the inserted end of the shaft but keyed thereto for rotation therewith, an impeller having a hub, said hub having a bore extending partially therethrough to receive the cupped bearing, means for locking the hub to the cupped bearing for rotation therewith but free to move in a direction lengthwise of the shaft, an expansible member interposed between the inner end of the bore of the hub and the cupped bearing, and a part carried by the hub at the axial center thereof with which the applied back plate contacts for maintaining the expansible member under pressure.

7. In a pump or the like, a housing, a bearing carried by the housing and having an end face within the housing, an impeller shaft extending within the housing through said bearing and extending beyond the inner face thereof, the portion of the housing opposed to the bearing being open, a plate for closing said open portion, a cupped bearing slidably mounted on the inserted end of the shaft but keyed thereto for rotation therewith, an impeller having a hub, said hub having a bore extending partially therethrough to receive the cupped bearing, means for locking the hub to the cupped bearing for rotation therewith but free to move in a direction lengthwise of the shaft, an expansible member interposed between the inner end of the bore of the hub and the cupped bearing, a part carried by the hub at the axial center thereof with which the applied back plate contacts for maintaining the expansible member under pressure, and a friction washer surrounding the shaft and interposed between the hub and the inner end face of the shaft bearing.

WALTER M. HOWSER.

REFERENCES CITED

The following references are of record in the file of this patent:

UNITED STATES PATENTS

| Number | Name | Date |
| --- | --- | --- |
| 1,764,706 | Willi | June 17, 1930 |
| 2,037,127 | Ford | Apr. 14, 1936 |
| 2,150,078 | Pollock | Mar. 7, 1939 |
| 2,352,636 | Jackman | July 4, 1944 |

FOREIGN PATENTS

| Number | Country | Date |
| --- | --- | --- |
| 256,718 | Great Britain | 1926 |